US011797711B2

(12) United States Patent
Lee et al.

(10) Patent No.: US 11,797,711 B2
(45) Date of Patent: Oct. 24, 2023

(54) ELECTRONIC DEVICE, METHOD FOR PROVIDING PERSONAL INFORMATION USING SAME, AND COMPUTER-READABLE RECORDING MEDIUM FOR RECORDING SAME

(71) Applicant: Samsung Electronics Co., Ltd., Gyeonggi-do (KR)

(72) Inventors: Jaeyoung Lee, Gyeonggi-do (KR); Kyungmoon Kim, Gyeonggi-do (KR); Yikeun Park, Gyeonggi-do (KR); Kichan Sung, Gyeonggi-do (KR); Dongjin Lee, Gyeonggi-do (KR); Heesoo Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 265 days.

(21) Appl. No.: 17/291,809

(22) PCT Filed: Oct. 30, 2019

(86) PCT No.: PCT/KR2019/014456
§ 371 (c)(1),
(2) Date: May 6, 2021

(87) PCT Pub. No.: WO2020/096262
PCT Pub. Date: May 14, 2020

(65) Prior Publication Data
US 2021/0390209 A1 Dec. 16, 2021

(30) Foreign Application Priority Data

Nov. 8, 2018 (KR) .......................... 10-2018-0136617

(51) Int. Cl.
*G06F 21/62* (2013.01)
*G06F 21/57* (2013.01)
(Continued)

(52) U.S. Cl.
CPC ........ *G06F 21/6254* (2013.01); *G06F 21/577* (2013.01); *G06F 21/602* (2013.01); *G06F 21/606* (2013.01); *G06F 21/64* (2013.01)

(58) Field of Classification Search
CPC .. G06F 21/6254; G06F 21/577; G06F 21/602; G06F 21/606; G06F 21/64
See application file for complete search history.

(56) References Cited

U.S. PATENT DOCUMENTS 10,102,570 B1 * 10/2018 Kapczynski ........... G06Q 40/02
10,477,361 B2 * 11/2019 Kane ....................... G06F 12/14
(Continued)

FOREIGN PATENT DOCUMENTS

KR 10-1590076 2/2016
KR 10-1628007 6/2016
(Continued)

OTHER PUBLICATIONS

PCT/ISA/210 Search Report issued on PCT/KR2019/014456, dated Feb. 5, 2020, pp. 5.
(Continued)

Primary Examiner — Stephen T Gundry
(74) Attorney, Agent, or Firm — The Farrell Law Firm, P.C.

(57) ABSTRACT

The present document relates to an electronic device, a method for providing personal information using same, and a computer-readable recording medium for recording same, wherein the electronic device may include a communication circuit, a storage, a display, and a processor. According to various embodiments, the processor may be configured to generate a smart contract comprising information on categories of personal information to be provided to an external user, information about the external user, and information about a de-identification level of the personal information to (Continued)

be provided; transfer the smart contract to a block chain; receive a request for provision of personal information from the block chain; process personal information of a user on the basis of the smart contract; and transfer the processed personal information to the block chain. Other various embodiments are possible.

13 Claims, 8 Drawing Sheets

(51) Int. Cl.
*G06F 21/60* (2013.01)
*G06F 21/64* (2013.01)

(56) References Cited

U.S. PATENT DOCUMENTS

| | | | | |
|---|---|---|---|---|
| 2016/0110352 | A1* | 4/2016 | Bendersky | G06Q 10/101 707/602 |
| 2016/0188895 | A1* | 6/2016 | Liu | G06N 20/00 726/17 |
| 2017/0109542 | A1* | 4/2017 | Kang | G06F 21/602 |
| 2017/0286717 | A1* | 10/2017 | Khi | G06F 21/6245 |
| 2017/0302450 | A1* | 10/2017 | Ebrahimi | H04L 9/3252 |
| 2018/0343222 | A1* | 11/2018 | Le Jouan | H04L 67/02 |
| 2019/0165949 | A1* | 5/2019 | Ramos | H04L 9/3239 |
| 2019/0205563 | A1* | 7/2019 | Gonzales, Jr. | G06Q 30/018 |
| 2019/0342336 | A1* | 11/2019 | Finkelstein | H04L 63/0428 |
| 2019/0379642 | A1* | 12/2019 | Simons | H04L 63/0414 |
| 2020/0005912 | A1* | 1/2020 | Saliman | G16H 10/60 |
| 2020/0074461 | A1* | 3/2020 | DeRosa-Grund | H04L 9/0643 |
| 2021/0065267 | A1* | 3/2021 | Smith | G06Q 20/4014 |
| 2021/0119801 | A1* | 4/2021 | Kim | H04L 67/535 |
| 2021/0125243 | A1* | 4/2021 | Hur | G06Q 50/01 |
| 2021/0133160 | A1* | 5/2021 | Craft | G06F 16/148 |
| 2021/0182431 | A1* | 6/2021 | Marin | G06F 21/57 |
| 2021/0195500 | A1* | 6/2021 | Choi | H04W 12/06 |
| 2021/0212581 | A1* | 7/2021 | Kim | A61B 5/6898 |
| 2021/0319492 | A1* | 10/2021 | Jeong | G06F 16/3334 |
| 2021/0383377 | A1* | 12/2021 | Zhou | H04L 9/3213 |
| 2022/0005072 | A1* | 1/2022 | Chhipa | H04N 21/81 |
| 2022/0040557 | A1* | 2/2022 | Tran | G06F 1/163 |
| 2023/0017855 | A1* | 1/2023 | Kikinis | G06Q 20/3827 |

FOREIGN PATENT DOCUMENTS

| | | |
|---|---|---|
| KR | 10-1704702 | 2/2017 |
| KR | 10-2017-0045703 | 4/2017 |

OTHER PUBLICATIONS

PCT/ISA/237 Written Opinion issued on PCT/KR2019/014456, dated Feb. 5, 2020, pp. 4.
Korean Office Action dated Jan. 9, 2023 issued in counterpart application No. 10-2018-0136617, 10 pages.

* cited by examiner

ELECTRONIC DEVICE, METHOD FOR PROVIDING PERSONAL INFORMATION USING SAME, AND COMPUTER-READABLE RECORDING MEDIUM FOR RECORDING SAME

PRIORITY

This application is a National Phase Entry of PCT International Application No. PCT/KR2019/014456 which was filed on Oct. 30, 2019, and claims priority to Korean Patent Application No. 10-2018-0136617, which was filed on Nov. 8, 2018, the content of each of which is incorporated herein by reference.

TECHNICAL FIELD

Various embodiments disclosed in the disclosure relate to an electronic device, a method for providing personal information using the same, and a computer-readable recording medium for recording the same, and for example, to the electronic device, the method and the recording medium, which can operate to provide personal information using a smart contract based on a block chain.

BACKGROUND ART

According to a method for managing personal information, a person provides personal information to an enterprise that operates a service when the person subscribes to the service, and the enterprise stores and manages the provided personal information in a database of the enterprise.

DISCLOSURE OF INVENTION

Technical Problem

In case of a method in which an enterprise collects and stores personal information when a person subscribes to a service, personal information which is not updated or personal information of which accuracy is not secured may be stored, and due to a lack of real-time properties of the stored personal information, costs for managing the personal information may occur.

In case of a method in which an enterprise collects and stores personal information when a person subscribes to a service, a legal burden may occur in storing the personal information.

In case of a method in which an enterprise collects and stores personal information when a person subscribes to a service, the de-identification level of the personal information is collectively set by an enterprise, and there may occur a difference between the de-identification level of the personal information collectively set by the enterprise and the de-identification level of the personal information recognized by a person.

Further, discomfort may occur in case that a person directly provides, changes, or deletes personal information when the person subscribes to, changes, or withdraws a service.

Solution to Problem

According to various embodiments disclosed in the disclosure, an electronic device may include: a communication circuit; a storage; a display; and a processor, wherein the processor is configured to: generate a smart contract including information on a category of personal information to be provided to an external user among user's personal information of the electronic device, information on the external user to be provided with the personal information, and information on a de-identification level of the personal information to be provided to the external user; transfer the smart contract to a block chain; receive a request to provide the personal information from the block chain; process the user's personal information encrypted and stored in the storage based on the smart contract in response to the request to provide the personal information; and transfer the processed personal information to the block chain.

According to various embodiments disclosed in the disclosure, a computer-readable recording medium may store a program to execute: generating, by a processor of an electronic device, a smart contract including information on a category of personal information to be provided to an external user among user's personal information of the electronic device, information on the external user to be provided with the personal information, and information on a de-identification level of the personal information to be provided to the external user; transferring the smart contract to a block chain through a communication circuit of the electronic device; receiving a request to provide the personal information from the block chain through the communication circuit of the electronic device; processing, by the processor of the electronic device, the user's personal information encrypted and stored in a storage based on the smart contract in response to the request to provide the personal information; and transferring the processed personal information to the block chain through the communication circuit of the electronic device.

Advantageous Effects of Invention

Since the electronic device according to the various embodiments of the disclosure provides the personal information updated with the latest information when the external device (e.g., server that is operated by the service providing enterprise) requests the personal information using the smart contract based on the block chain, the real-time properties of the provided personal information can be secured, and the accuracy of the personal information can be secured through transparent disclosure of the contents of the smart contract on the block chain.

According to the electronic device according to the various embodiments of the disclosure, since the person directly stores the personal information and provides the stored personal information only when requested by the enterprise, the enterprise's burden on the personal information management and the burden on the law compliance on the personal information protection can be minimized.

According to the electronic device according to the various embodiments of the disclosure, since the person directly sets a personal information providing condition and a personal information providing level, the person can efficiently protect his/her own personal information.

According to the electronic device according to the various embodiments of the disclosure, since the person manages the personal information, the person can easily manage the personal information.

MODE FOR THE INVENTION

Figure 1:
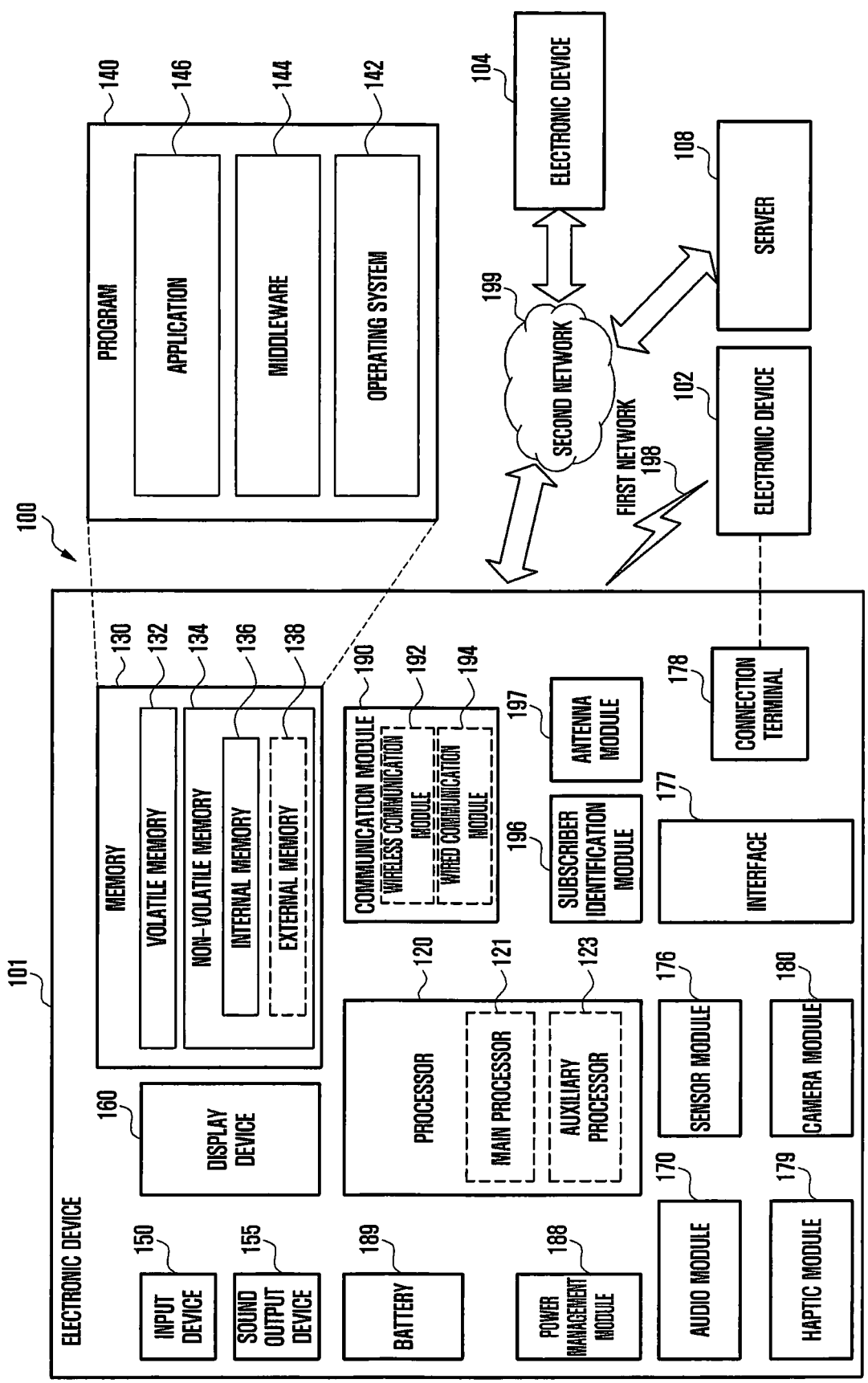
FIG. 1 is a block diagram of an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module(SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
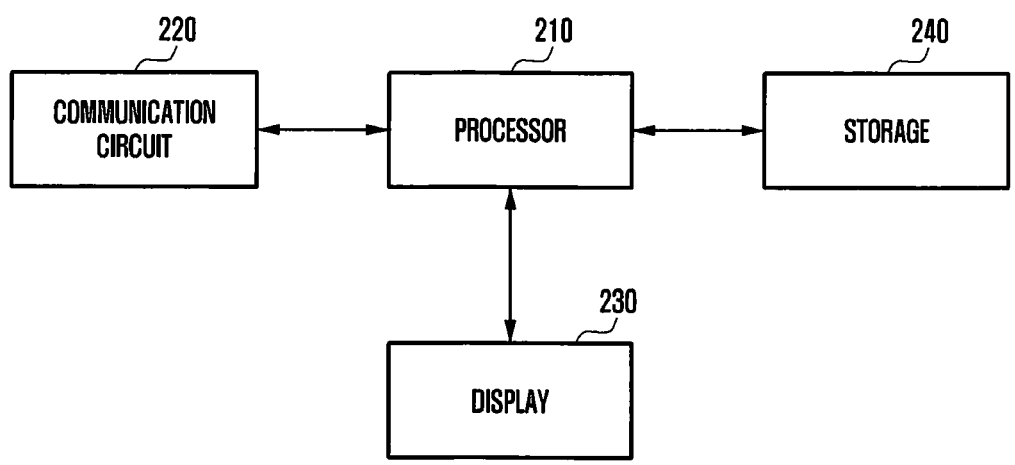
FIG. 2 is a hardware block diagram of an electronic device according to various embodiments of the disclosure.

FIG. 2 is a hardware block diagram of an electronic device according to various embodiments of the disclosure.

Referring to FIG. 2, an electronic device (e.g., electronic device 101 of FIG. 1) according to various embodiments of the disclosure may include a processor 210 (e.g., processor 120 of FIG. 1), a communication circuit 220 (e.g., communication module 190 of FIG. 1), a display 230 (e.g., display 160 of FIG. 1), and a storage 240 (e.g., memory 130 of FIG. 1), and at least parts of the illustrated configurations may be omitted or replaced and parts of the constituent elements of FIG. 1 may be added.

According to various embodiments, the processor 210 is a configuration capable of performing a control of respective constituent elements of the electronic device and/or an operation or data process related to communications, and may include at least parts of the configurations and/or functions of the processor 120 of FIG. 1. The processor 210 according to various embodiments may be electrically connected to the communication circuit 220, the display 230, or the storage 240, which is the internal constituent element of the electronic device.

According to various embodiments, the communication circuit 220 may be connected to a network through wireless communications or wired communications, and may communicate with at least one electronic device 102 or a server 108. According to various embodiments, the communication circuit 220 may establish a communication channel with a block chain, and may perform transmission/reception of various pieces of data with the block chain. According to various embodiments, the communication circuit 220 may include a cellular communication module, and may be configured to be connected to a cellular network (e.g., 3G, LTE, 5G, Wibro, or Wimax), and the network may include at least one of a telecommunications network, for example, a computer network (e.g., LAN or WAN), an Internet, or a telephone network.

According to various embodiments, the block chain may mean a block chain distributed network including a plurality of nodes.

According to various embodiments, the communication circuit 220 may include a network routing module broadcasting a transaction to the block chain distributed network or a gateway router connected to a pool mining node.

According to various embodiments, the storage 240 may store therein user's personal information input by a user. The personal information may be encrypted with, for example, a private key, and may be stored in the storage. According to various embodiments, the storage 240 may store a smart contract. The smart contract is an automation contract technology based on a block chain, and may mean a computer transaction protocol for executing contract conditions. For example, the smart contract may mean a digital contract method which encodes the contract conditions based on the block chain technology and performs the contract contents if the contract contents meet the conditions. The smart contract may be, for example, a contract for a transaction of personal information (e.g., user's phone number and user's email address) between the user of the electronic device 101 and an external user (e.g., enterprise).

According to various embodiments, the processor 210 may generate the smart contract for the personal information transaction. The smart contract for the personal information transaction may include, for example, information on a category of the personal information to be provided to the external user, information on the external user to be provided with the personal information, and information on the personal information providing level (e.g., de-identification level) to be provided to the external user. The contents included in the smart contract may be set by the user of the electronic device.

According to various embodiments, the processor 210 may control the display 230 to output a setting screen for setting the category of the personal information to be provided, the external user to be provided with the personal information, or the de-identification level of the personal information to be provided. The user of the electronic device 101 may set the contents about the category of the personal information to be provided to the external user and the external user to be provided with the personal information, and such information may be included in the smart contract as the execution conditions of the smart contract. The de-identification level of the personal information to be provided, which is set by the user of the electronic device 101, may mean the personal information processing level according to the execution of the smart contract, and may be included in the smart contract.

According to various embodiments, the communication circuit 220, under the control of the processor 210, may transfer the smart contract to the block chain. The smart contract transferred to the block chain may be synchronized with all users in the block chain, and the contents of the smart contract may be released to all the users in the block chain.

According to various embodiments, the communication circuit 220 may receive a request to provide the personal information according to the smart contract execution from the block chain.

According to various embodiments, the processor 210 may identify whether the received request to provide the personal information matches the personal information providing condition on the smart contract. If the request to provide the personal information is received from the block chain, the processor 210 may identify information on the external user of the external device having executed the smart contract synchronized with the block chain in order to be provided with the personal information and information on the category of the personal information requested by the external device. The processor 210 may identify, for example, whether the identified information on the external user corresponds to the external user to be provided with the personal information included in the smart contract. The processor 210 may identify, for example, whether the information on the category of the personal information requested by the external device corresponds to the personal information category to be provided to the external user included in the smart contract.

For example, in case that the external user having requested to provide the personal information corresponds to the external user to be provided with the personal information included in the smart contract, and the personal information requested by the external user corresponds to the personal information category to be provided to the external user included in the smart contract, the processor 210 may determine that the received request to provide the personal information matches the personal information providing condition on the smart contract.

According to various embodiments, if the request to provide the personal information matches the condition on the smart contract, the processor 210 may process (e.g., personal information processing) the personal information stored in the storage 240 to meet the personal information de-identification level on the smart contract. A method for processing the personal information may be a method for de-identifying the personal information stored in the storage to a predetermined level. For example, the processor 210 may de-identifies the personal information using at least one method of pseudonymization, aggregation, data reduction, data suppression, data masking, or differential privacy. The electronic device 101 according to various embodiments may store an algorithm for performing the method for processing the personal information.

The pseudonymization may be a method for changing the name of the personal information subject to another name. For example, the pseudonymization may include heuristic pseudonymization for de-identifying the personal information by replacing values corresponding to identifiers (values or names uniquely given to persons or objects) in accordance with a determined rule, encryption for processing the personal information using an algorithm having a predetermined rule, or swapping for exchanging values in association with predetermined external variable values.

The aggregation may be a method for processing numerical values of a plurality of identifiers as the total sum or an average value. For example, the aggregation may include an aggregation method that is a method for aggregating the entire personal information, a micro aggregation method for aggregating only a predetermined part of the personal information, a rounding method for performing final aggregation of the aggregated value by applying rounding (e.g., round-up or round-down) criteria, or a rearrangement method for rearranging data so that a person is not identified while maintaining the existing information values.

The data reduction may be a method for reducing all or parts of the identifier information. For example, the data reduction may include a method for reducing all the identifiers, a method for reducing parts of the identifiers, and a method for reducing not only the identifiers but also identification factors in all.

The data suppression may be a method for processing a specific value of the identifier as a range. For example, the data suppression may include a concealing method for converting the specific value into an average or category value or a random rounding method for rounding up or down the specific numerical value.

The data masking may be a method for processing some values of the identifiers to be invisible. For example, the data masking may include a method for changing an identifier to a replacement letter (e.g., *) or blank or a method for adding a certain numeral or a symbol.

The differential privacy may be a method for making existence/nonexistence of a specific person unable to be known by intentionally inserting a non-deterministic noise into data. For example, the differential privacy may be a method for making distributions of resultant values have a difference of a predetermined level or less by adding noises to the resultant values of an information set including information on a certain person and an information set that does not include the information on the certain person, respectively.

According to various embodiments, the processor 210 may transfer, to the block chain, the personal information processed to meet the de-identification level of the personal information on the smart contract. For example, a method for transferring the personal information to the block chain may be a method in which the electronic device performs the transaction. The smart contract transferred to the block chain may be executed through the transaction performed by the electronic device.

Figure 3:
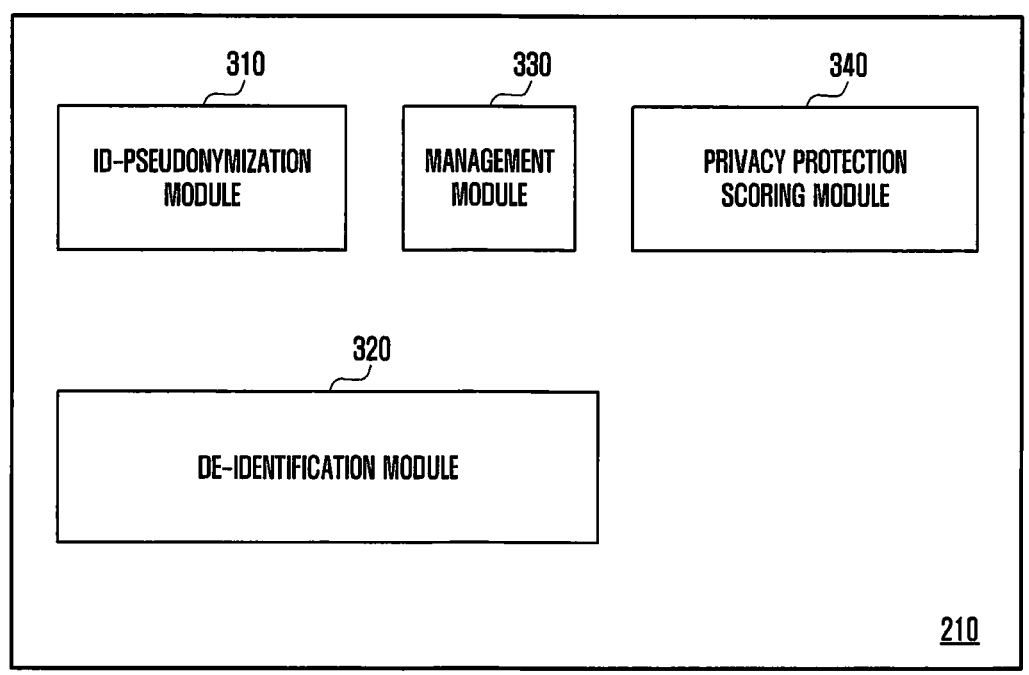
FIG. 3 is a software block diagram of an electronic device according to various embodiments of the disclosure.

FIG. 3 is a software block diagram of an electronic device according to various embodiments of the disclosure.

Referring to FIG. 3, software of the electronic device may include an ID-pseudonymization module 310, a de-identification module 320, a service management module 330, and a privacy protection scoring module 340. The software modules may be implemented by software on the processor 210.

The ID-pseudonymization module 310 may be a module that deletes or replaces the user's identification information using the personal information processing method as described above. For example, the ID-pseudonymization module 310 may be a module for pseudonymizing information including the identifier (identifier data). For example, the information including the identifier may mean personal information (e.g., email) which user identification is possible by itself. For example, the ID-pseudonymization module 310 may include a method for replacing a user's phone number by a random value, such as "A23B23345B".

The de-identification module 320 may be a module for de-identifying the information to be provided through the personal information de-identification technology using the method for processing the personal information as described above. For example, the de-identification module 320 may be a module for de-identifying privacy information (privacy data, e.g., browsing cookies) generated by the user.

According to various embodiments, the processor 210 may check adequacy of the de-identification measure of the personal information. For example, a method for checking the adequacy of the de-identification measure may include k-anonymity check, l-diversity check, t-closeness check, or differential privacy check.

The k-anonymity check is a privacy protection model for defending against a connection attack on released data, and may be a method for checking whether at least k same values exist in a given data set. The l-diversity check is a privacy protection model for defending against an attack by homogeneity and background knowledge, and may be a method for checking whether data being de-identified together in a given data set has at least 1 pieces of different sensitive information. The t-closeness check is a privacy protection model for protecting against a similarity attack, and may be a model for checking whether specific information distribution and full data information distribution show a difference that is equal to or smaller than t. The differential privacy check may be a privacy protection model for preventing the personal information release and leakage being originated from calculation of the information set. For example, the personal information de-identified by the differential privacy is required to maintain sameness of a predetermined level or more before and after adding or removing the noise. For example, the sameness may be defined as a variable $\varepsilon$ (epsilon). As the $\varepsilon$ value becomes smaller, more noise may be added, and as more noise is added, it may be difficult to discriminate the personal information. For example, the differential privacy check may be a method for checking the adequacy of the de-identification in accordance with the e (epsilon) value.

The service management module 330 may be a module that manages software. The service management module 330 may manage one or more user interface resources being output through the display.

The privacy protection scoring module 340 may be a module that compares a quantified risk according to the personal information de-identification level set by the user with a quantified risk of the de-identified personal information. The quantified risk according to the personal information de-identification level set by the user may be expressed, for example, as a quantified numerical value of the risk on how much the user is able to be identified through the de-identification level of the personal information to be provided to the external user set by the user through the setting screen. For example, as the quantified risk in accordance with the personal information de-identification level set by the user is lowered, it may mean a state in which the personal information is set to be de-identified enough to be unable to identify the user.

The quantified risk of the de-identified personal information may be expressed, for example, as a quantified numerical value of the risk on how much the users are able to be identified through the de-identified personal information processed by the processor through the de-identification module. For example, as the quantified risk of the de-identified personal information is lowered, it may mean a state in which the personal information is de-identified enough to be unable to identify the user.

For example, in case that the risk of the de-identified personal information is higher than the risk according to the personal information de-identification level set by the user, the processor 210 may not provide the processed personal information to the block chain, but may reprocess the personal information so that the personal information matches the personal information de-identification level set by the user. For example, in case that the risk of the de-identified personal information is lower than the risk according to the personal information de-identification level set by the user, the processor 210 may control to transfer the processed personal information to the block chain.

Figure 4:
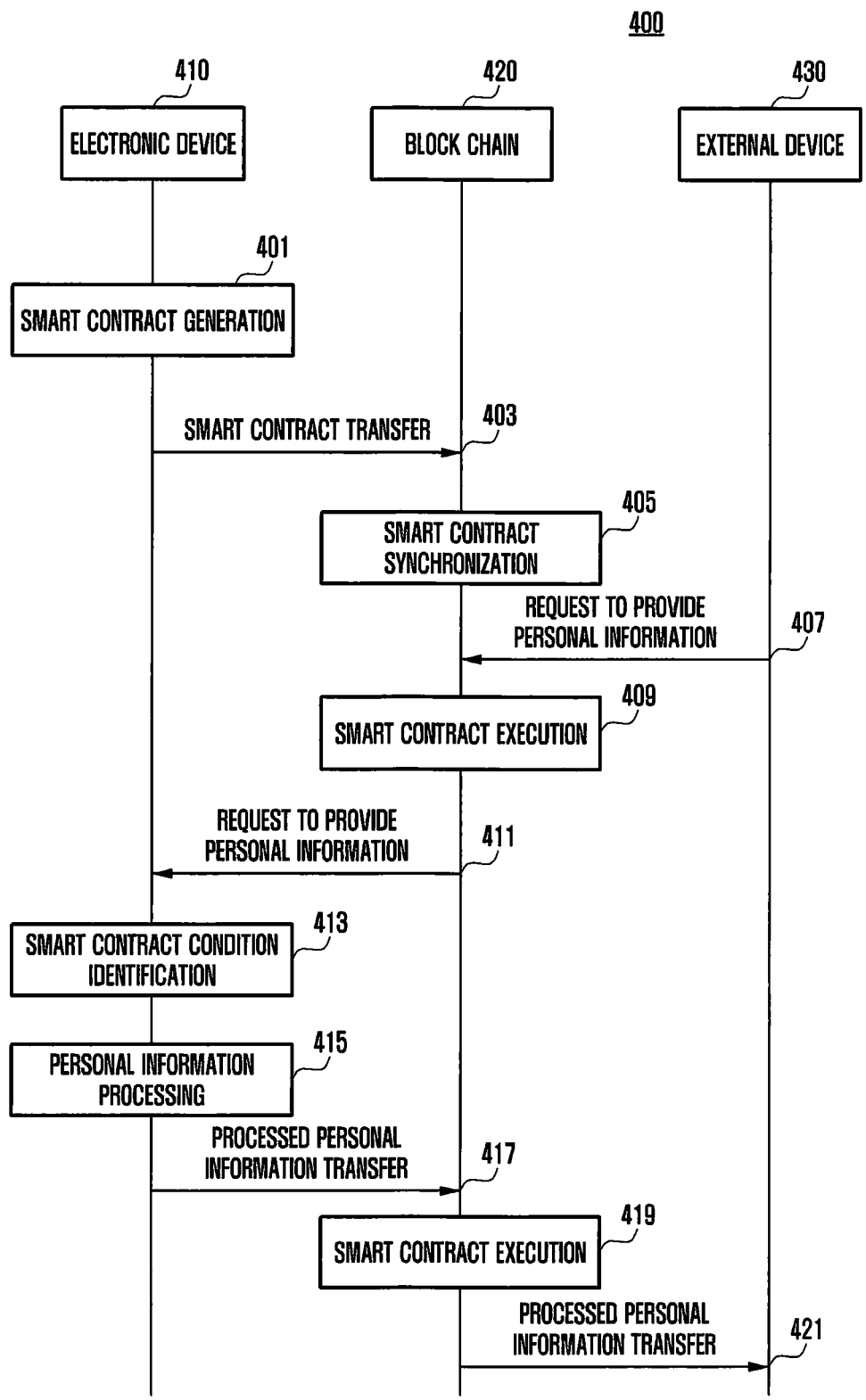
FIG. 4 is an operational flowchart illustrating the relationship among an electronic device, a block chain, and an external device according to various embodiments of the disclosure.

FIG. 4 is an operational flowchart illustrating the relationship among an electronic device, a block chain, and an external device according to various embodiments of the disclosure.

Referring to the operational flowchart 400, an electronic device 410 (e.g., electronic device 101 of FIG. 1) may transfer a smart contract for a personal information transaction to a block chain 420, and an external device 430 (e.g., server of an enterprise that provides a service) may request the block chain 420 to provide personal information, and may receive the personal information processed based on the smart contract and transferred from the block chain 420.

According to various embodiments, the electronic device 410, at operation 401, may generate the smart contract. The smart contract may be, for example, the contract for the personal information transaction between the user of the electronic device 410 and the external device 430. The external user means the user of the external device. The external device may include information on the external user, and an operation performed by the external device may be recognized as an operation performed by the external user.

According to various embodiments, the processor 210 of the electronic device 410 may generate the smart contract for the personal information transaction. The smart contract for the personal information transaction may include, for example, information on a category of the personal information to be provided to the external user, information on the external user to be provided with the personal information, and information on the personal information de-identification level. The contents included in the smart contract may be set by the user of the electronic device 410. The processor may control the display 230 to output a setting screen for setting the category of the personal information to be provided to the external user, the external user to be provided with the personal information, and the de-identification level of the personal information to be provided to the external user.

The user of the electronic device 410 according to various embodiments may set, for example, the de-identification level of the personal information to be provided by categories of the personal information and by external users. The personal information providing conditions (information on the category of the personal information to be provided and information on the external user to be provided with the personal information) set by the user and the information on the personal information de-identification level may be included in the contents of the smart contract.

At operation 403, the electronic device 410 may transfer the smart contract to the block chain 420.

At operation 405, the transmitted smart contract may be synchronized on the block chain 420. The smart contract that is synchronized with the block chain 420 is released to all users (e.g., a plurality of nodes) in the block chain 420, and is distributed and stored. In case of the transaction performed through the smart contract based on the block chain 420, transparency of the transaction can be increased, and safety against forgery/falsification can be increased.

At operation 407, the external device 430 may request the block chain 420 to provide the personal information. For example, the external device 430 may request the desired personal information by a query. In case that the block chain 420 is requested by the query to provide the personal information from the external device 430, the smart contract synchronized with the block chain 420 may be executed. In case that the smart contract synchronized with the block chain 420 is executed, the block chain 420 may transfer the request to provide the personal information to the electronic device 410 in response to the execution of the smart contract.

At operation 411, the block chain 420 may transfer the request to provide the personal information in accordance with the execution of the smart contract to the electronic device 410. The block chain 420 according to various embodiments may identify whether the personal information requested by the external device 430 matches the personal information providing condition on the smart contract. In case that the personal information requested by the external device 430 matches the personal information providing condition on the smart contract, the block chain 420 may return the request to provide the personal information to the electronic device 410 that is the concerned party of the smart contract. In case that the personal information requested by the external device 430 does not match the personal information providing condition on the smart contract, the block chain 420 may not execute the smart contract. In case that the smart contract is not performed, the block chain 420 may not return the request to provide the personal information to the electronic device 410.

At operation 413, the electronic device 410 may identify whether the request to provide the personal information from the external device 430 matches the personal information providing condition included in the smart contract. For example, the electronic device 410 may identify whether the external user of the external device 430 having requested the personal information corresponds to the external user to be provided with the personal information included in the smart contract and whether the personal information requested by the external device 430 is included in the personal information category that can be provided to the external user included in the smart contract.

In case that the personal information requested by the external device 430 matches the personal information providing condition on the smart contract, the operation proceeds with operation 415, and the electronic device 410 may process the personal information to meet the personal information de-identification level on the smart contract. A method for processing the personal information may be, for example, a method for de-identifying the personal information using at least one method of pseudonymization, aggregation, data reduction, data suppression, data masking, or differential privacy. The electronic device 410 according to various embodiments may store an algorithm for performing the method for processing the personal information.

At operation 417, the electronic device 410 may transfer the processed personal information to the block chain 420. A method for transferring the personal information to the block chain 420 may be, for example, a method in which the electronic device 410 performs the transaction. The electronic device 410 may execute the smart contract transferred to the block chain 420 through the transaction performed by the electronic device 410.

At operation 419, the block chain 420 may execute the smart contract in response to the reception of the processed personal information transferred from the electronic device 410. The transaction performed by the electronic device 410 may execute the smart contract on the block chain 420.

At operation 421, the block chain 420 may transfer the processed personal information to the external device 430 in response to the execution of the smart contract.

Figure 5:
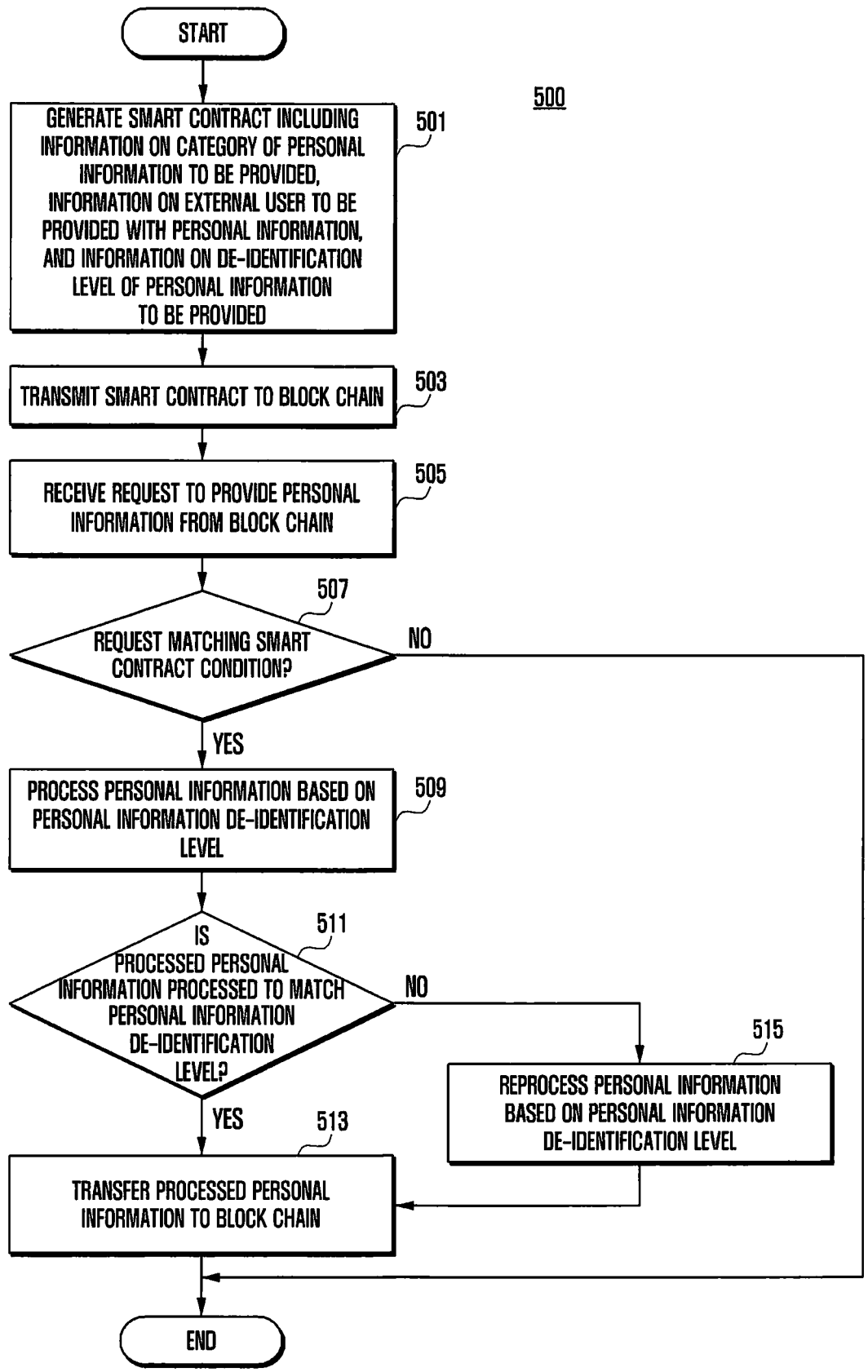
FIG. 5 is an operational flowchart of an electronic device according to various embodiments of the disclosure.

FIG. 5 is an operational flowchart of an electronic device according to various embodiments of the disclosure.

Referring to the operational flowchart 500, the electronic device 410 may transfer the smart contract for the personal information transaction to the block chain 420, and if there is a request to provide the personal information that matches the smart contract, the electronic device 410 may transfer the personal information processed based on the set personal information de-identification level to the block chain 420.

At operation 501, the electronic device 410 may generate the smart contract including information on a category of the personal information to be provided to the external user among the user's personal information of the electronic device 410, information on the external user to be provided with the personal information, and the contents of the personal information de-identification level to be provided to the external user. The information on the category of the personal information to be provided to the external user and the information on the external user to be provided with the personal information may be, for example, the personal information providing condition. The personal information providing condition and the personal information de-identification level to be provided to the external user may be set by the user of the electronic device 410. The personal information de-identification level may be set, for example, by personal information categories or by external users.

According to various embodiments, the processor may control the display 230 to output a setting screen for setting the category of the personal information to be provided to the external user, the external user to be provided with the personal information, and the de-identification level of the personal information to be provided to the external user.

At operation 503, the electronic device 410 may transfer the generated smart contract to the block chain. The transferred smart contract may be synchronized with and may be released to all users included in the block chain.

At operation 505, the electronic device 410 may receive the request to provide the personal information from the block chain 420. For example, if the smart contract on the block chain is executed through the request to provide the personal information from the external device 430, the block chain 420 may transfer the request to provide the personal information to the electronic device 410 that is the concerned party of the smart contract.

At operation 507, the processor 210 of the electronic device 410 may determine whether the transferred request to provide the personal information is the request that matches the personal information providing condition on the smart contract. For example, the electronic device 410 may identify the external user of the external device 430 having requested to provide the personal information, and may determine whether the external user matches the information on the external user to be provided with the personal information included in the smart contract. For example, the electronic device 410 may identify the category of the requested personal information, and may determine whether the category of the requested personal information by the external device 430 matches the information on the category of the personal information to be provided on the smart contract.

In case that the request to provide the personal information transferred from the block chain 420 matches the personal information providing condition on the smart contract, the operation is branched to operation 509, and the electronic device 410 may process the personal information based on the personal information de-identification level on the smart contract.

In case that the transferred request to provide the personal information does not match the personal information providing condition on the smart contract, the electronic device 410 may not return the personal information to the block chain 420.

At operation 511, the electronic device 410 may perform an operation to identify whether the processed personal information is processed to meet the personal information de-identification level.

In case that the processed personal information is processed to meet the personal information de-identification level, the operation is branched to operation 513, and the electronic device 410 may transfer the processed personal information to the block chain 420.

In case that the processed personal information is processed not to meet the personal information de-identification level, the operation is branched to operation 515, and the electronic device 410 may reprocess the personal information to meet the personal information de-identification level on the smart contract.

Figure 6:
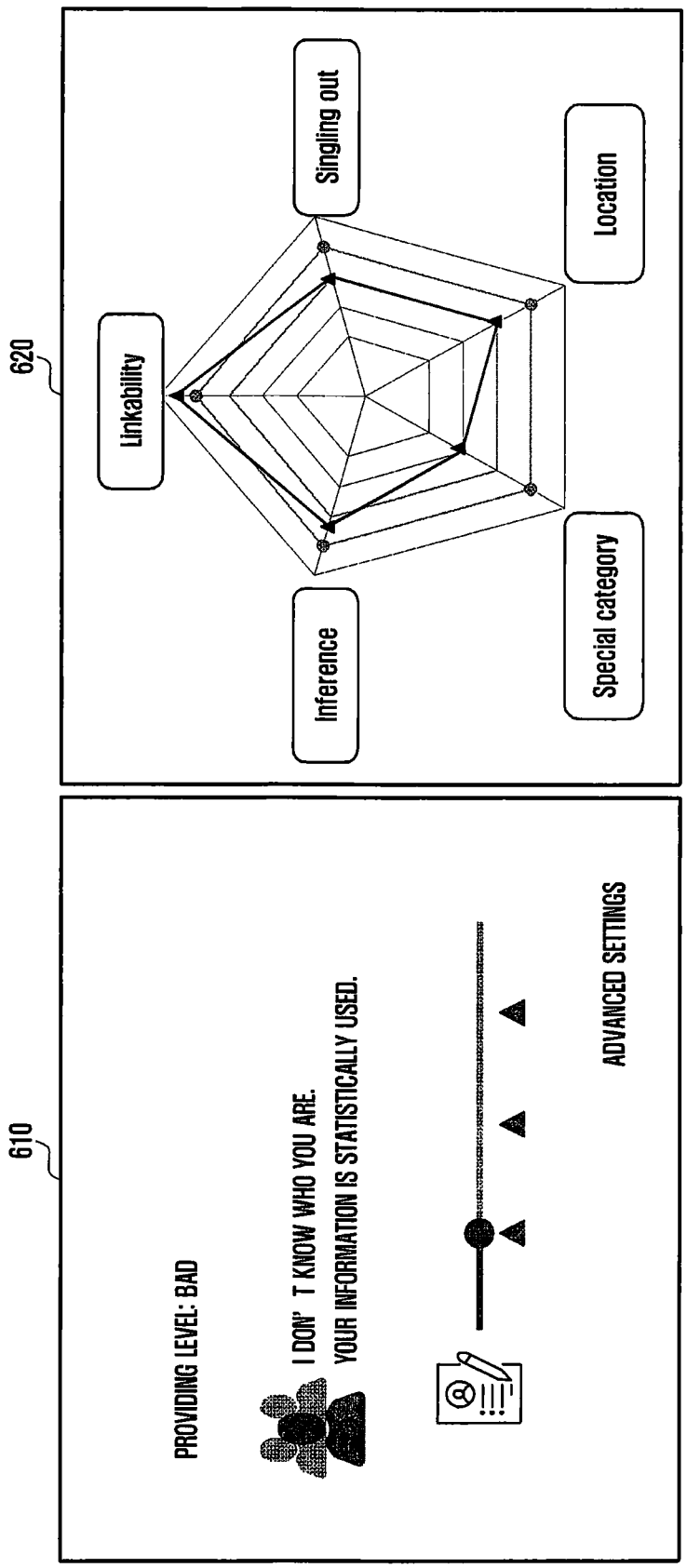
FIG. 6 is a diagram illustrating a screen for setting the de-identification level of personal information according to various embodiments of the disclosure.

FIG. 6 is a diagram illustrating a screen for setting the de-identification level of personal information according to various embodiments of the disclosure.

Referring to FIG. 6, the user of the electronic device 410 may set the personal information de-identification level. For example, the user of the electronic device 410 may simply set the personal information de-identification level, and specifically, may set the personal information de-identification level based on the personal information category or the designated evaluation criteria.

A screen 610 is an example of a setting screen for simply setting the personal information de-identification level. For example, the electronic device 410 may output the setting screen through the display so that the personal information de-identification level is divided into three levels of good/average/bad. For example, in case that the personal information de-identification level is set to "bad" as on the screen 610, the electronic device 410 may process the personal information so that it is not identified who the user is, and in this case, the user's personal information will be able to be used only statistically. In contrast, in case that the personal information de-identification level is set to "good", the electronic device 410, for example, may process the personal information so that it is identified who the user is.

A screen 620 is specifically an example of a setting screen for setting the personal information de-identification level based on a plurality of evaluation criteria.

For example, the electronic device 410 according to various embodiments may display the setting screen for setting the personal information de-identification level based on the evaluation criteria, such as linkability, singling out, inference, special category, and location. For example, the electronic device 410 may process the personal information based on the set personal information de-identification level.

The linkability may be a criterion for evaluating, for example, how much the provided personal information has the linkability to other released personal information. The singling out may be a criterion for evaluating, for example, how much the provided personal information itself has the singling out. The inference may be a criterion for evaluating, for example, how much the user is able to be estimated through a combination between the provided personal information. The special category may be a criterion for evaluating, for example, whether to provide sensitive personal information (e.g., health information, credit information, religion, and political orientation). The location may be a criterion for evaluating, for example, location information providing. For example, referring to the screen 620, based on the set personal information de-identification level, the electronic device can provide the personal information having the high linkability to the external user having requested this even if the personal information is processed enough to identify the user, whereas the electronic device can provide the personal information corresponding to the sensitive category to the external user only in case that the personal information is processed enough to de-identify the user.

According to various embodiments, the user may set the personal information de-identification level by personal information categories or by external users.

Figure 7:
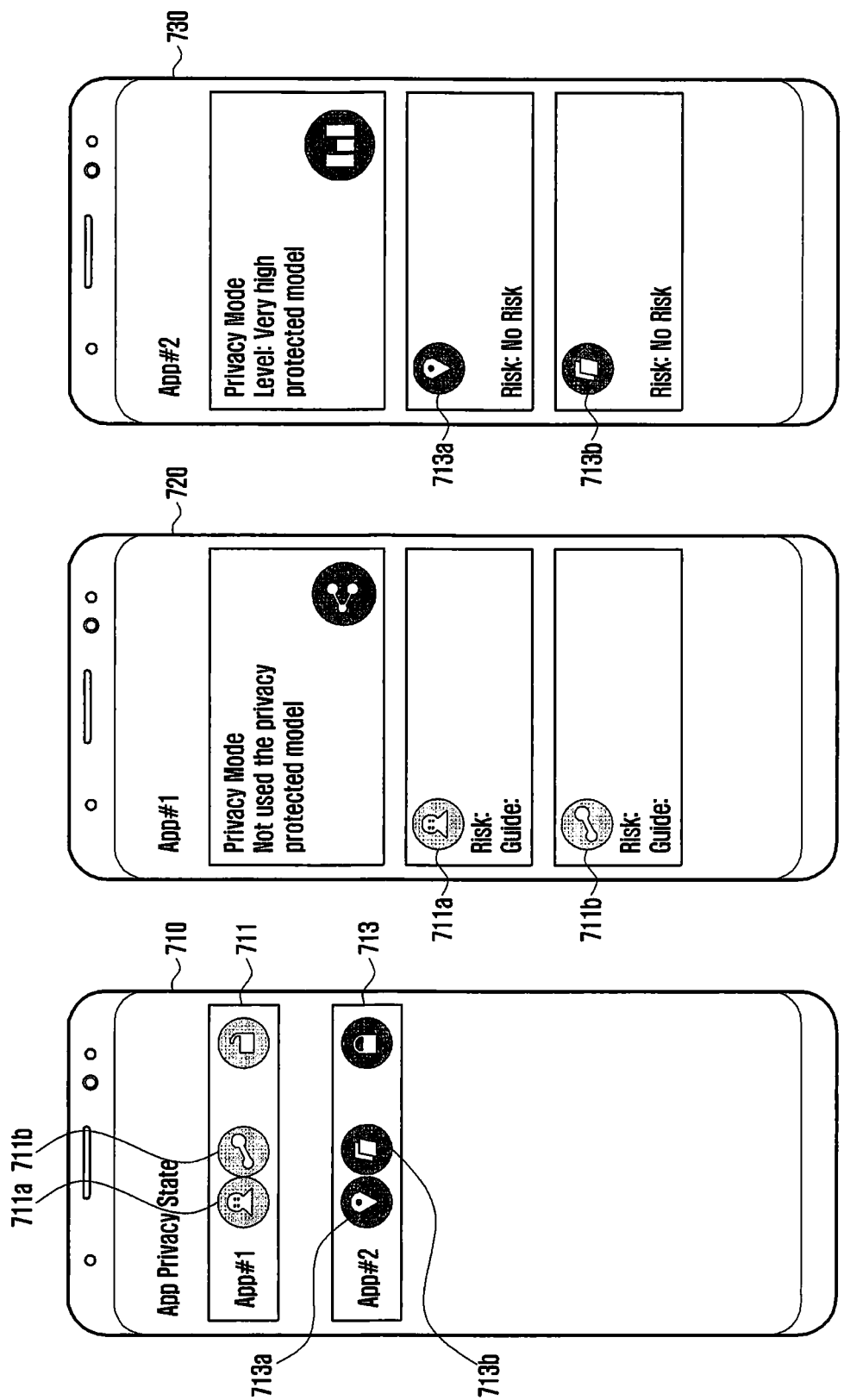
FIG. 7 is a diagram illustrating screens which are set for external users to output personal information categories and personal information de-identification levels to be provided to the external users according to various embodiments of the disclosure.

FIG. 7 is a diagram illustrating screens which are set for external users to output personal information categories and personal information de-identification levels to be provided to the external users according to various embodiments of the disclosure.

Referring to FIG. 7, the electronic device 410 may differently set the categories of the personal information to be provided by external users and the personal information de-identification level to be provided. According to various embodiments, the electronic device 410 may output, through the display, a user interface for displaying the categories of the personal information to be provided to the external user and the personal information de-identification level to be provided to the external user, which are set by external users.

A screen 710 is a user interface screen collectively showing the categories of the personal information to be provided to the external user and the personal information de-identification level, which are set by external users. For example, the electronic device 410 may output the user interface capable of identifying which personal information is set to be de-identified to what degree and to be provided to which external user.

For example, in case of App #1 711, referring to a screen 720, it can be known that the personal information de-identification level is set to be low. For example, the electronic device may display that the security level of App #1 711 is set to be low, may set user's age information and health information to be able to be provided to a manager of App #1, and may display that the user's age information and health information are set to be processed and provided at a low de-identification level when providing to a manager of App #1. For example, brightly colored items 711a and 711b may mean that the de-identification level of the related personal information is set to be low. For example, referring to the item 711a, since the de-identification level is set to be low when providing the personal information related to the age to the manager of App #1, the user's age information may be processed at the low de-identification level and may be provided to the manager of App #1.

For example, in case of App #2 713, referring to a screen 730, the personal information de-identification level is set to be high. For example, the electronic device may display that the security level of App #2 713 is set to be high, may set location information and credit card information to be able to be provided to a manager of App #2, and may display that the location information and credit card information are set to be processed and provided at a high de-identification level when providing to a manager of App #2. For example, dark colored items 713a and 713b may mean that the de-identification level of the related personal information is set to be high. For example, referring to the item 713a, since the de-identification level is set to be high when providing the personal information related to the location to the manager of App #2, the user's location information may be processed at the high de-identification level and may be provided to the manager of App #2.

Figure 8:
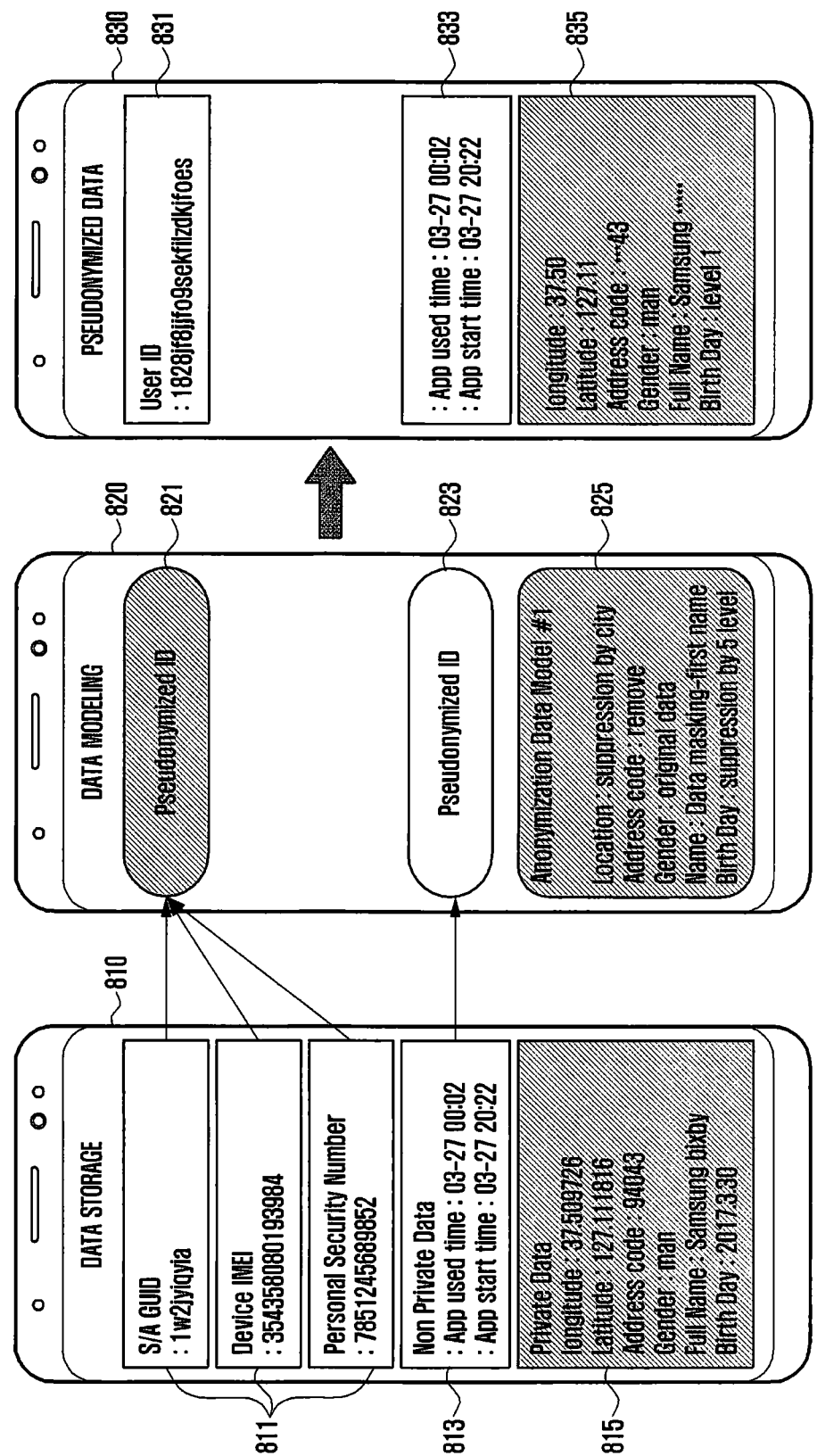
FIG. 8 is a diagram illustrating de-identification processes by personal information categories according to various embodiments of the disclosure.

FIG. 8 is a diagram illustrating de-identification processes by personal information categories according to various embodiments of the disclosure.

Referring to FIG. 8, the storage 240 may store therein plural pieces of information. The plural pieces of information may include, for example, personal information including the identifier (identifier data) 811, privacy information (privacy data) 815, and non-privacy information (non-privacy data) 813. For example, the personal information including the identifier 811 may mean information that can be identified by itself. The privacy information 815 may mean, for example, personal information generated by the user.

According to various embodiments, the processor 210 may process the personal information including the identifier 811 as pseudonymized data 831 by de-identifying 821 the personal information including the identifier 811. For example, a device value stored in the storage may be the personal information including the identifier 811 which is the information that can be identified by itself. The device value may be processed as the pseudonymized data 831 through the user pseudonymized module.

According to various embodiments, the processor 210 may process the privacy information 815 as pseudonymized data 835 by de-identifying 825 the privacy information 815. For example, the location information stored in the storage 240 may be the personal information generated by the user. The privacy information 815 may be processed as the pseudonymized data 835 through the de-identification module.

The electronic device according to various embodiments disclosed in the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device comprising:
a communication circuit;
a storage;
a display; and
a processor,
wherein the processor is configured to:
generate a smart contract including information on a category of personal information to be provided to an external user among a user's personal information of the electronic device, information on the external user to be provided with the personal information, and information on a de-identification level of the personal information to be provided to the external use,
transfer the smart contract to a block chain,
receive a request to provide the personal information from the block chain; process the user's personal information encrypted and stored in the storage based on the smart contract in response to the request to provide the personal information,
check whether the processed personal information is processed so as to be suitable for the information on the de-identification level of the personal information included in the smart contract,
transfer the processed personal information to the block chain in case that the personal information is processed so as to be suitable for the information on the de-identification level of the personal information included in the smart contract as a result of the checking, and
reprocess the personal information so as to be suitable for the information on the de-identification level of the personal information included in the smart contract in case that the personal information is not processed so as to be suitable for the information on the de-identification level of the personal information included in the smart contract as a result of the checking.

2. The electronic device of claim 1, wherein the processor is configured to control the display to output a setting screen for setting the category of the personal information to be provided to the external user, the external user to be provided with the personal information, and the de-identification level of the personal information to be provided to the external user.

3. The electronic device of claim 2, wherein the processor is configured to control the display to output a user interface for displaying the category of the personal information to be provided and the de-identification level of the personal information, which are set by external users.

4. The electronic device of claim 1, wherein the processor is configured to process the requested personal information based on the information on the de-identification level of the personal information included in the smart contract in case that the external user having requested to provide the personal information and the requested personal information match the information on the external user to be provided with the personal information included in the smart contract and the information on the category of the personal information to be provided.

5. The electronic device of claim 1, wherein the information on the de-identification level of the personal information included in the smart contract is the information on the de-identification level of the personal information determined based on a risk set by the user by personal information categories or by designated evaluation criteria, and
wherein the processor is configured to de-identify the personal information using at least one method of pseudonymization, aggregation, data reduction, data suppression, data masking, or differential privacy.

6. The electronic device of claim 1, wherein the processor is configured to:
generate a first value obtained by quantifying a risk according to the de-identification level of the personal information set by the user, generate a second value obtained by quantifying a risk of the processed personal information, and check by comparing the first value and the second value.

7. The electronic device of claim 1, wherein the processor is configured to:
generate a transaction on the processed personal information and transfer the generated transaction to the block chain, and
wherein the transaction is a request for execution of the smart contract being stored in the block chain.

8. A non-transitory computer-readable recording medium storing a program for an electronic device to execute a method for providing personal information, wherein the method for providing the personal information comprises:
generating, by a processor of the electronic device, a smart contract including information on a category of personal information to be provided to an external user among user's personal information of the electronic device, information on the external user to be provided with the personal information, and information on a de-identification level of the personal information to be provided to the external user;
transferring the smart contract to a block chain through a communication circuit of the electronic device;
receiving a request to provide the personal information from the block chain through the communication circuit of the electronic device;
processing, by the processor of the electronic device, the user's personal information encrypted and stored in a storage based on the smart contract in response to the request to provide the personal information;
checking whether the processed personal information is processed so as to be suitable for the information on the de-identification level of the personal information included in the smart contract;
transferring the processed personal information to the block chain in case that the personal information is processed so as to be suitable for the information on the de-identification level of the personal information included in the smart contract as a result of the checking; and
reprocessing the personal information so as to be suitable for the information on the de-identification level of the personal information included in the smart contract in case that the personal information is not processed so as to be suitable for the information on the de-identification level of the personal information included in the smart contract as a result of the checking.

9. The non-transitory computer-readable recording medium of claim 8, wherein the method for providing the personal information further comprises outputting a setting screen for setting the category of the personal information to be provided, the external user to be provided with the personal information, and the de-identification level of the personal information to be provided through a display of the electronic device.

10. The non-transitory computer-readable recording medium of claim 9, wherein processing the user's personal information comprises processing the requested personal information based on the information on the de-identification level of the personal information included in the smart contract in case that the external user having requested to provide the personal information and the requested personal information match the information on the external user to be provided with the personal information included in the smart contract and the information on the category of the personal information to be provided.

11. The non-transitory computer-readable recording medium of claim 9, wherein the method for providing the personal information further comprises outputting a user interface for displaying the category of the personal information to be provided and the de-identification level of the personal information, which are set by external users, through the display.

12. The non-transitory computer-readable recording medium of claim 8, wherein the information on the de-identification level of the personal information included in the smart contract is the information on the de-identification level of the personal information determined based on a risk set by the user by personal information categories or by designated evaluation criteria, and
wherein processing the user's personal information comprises de-identifying the personal information using at least one method of pseudonymization, aggregation, data reduction, data suppression, data masking, or differential privacy.

13. A method for providing personal information of an electronic device, the method comprising:
generating, by a processor of the electronic device, a smart contract including information on a category of personal information to be provided to an external user among a user's personal information of the electronic device, information on the external user to be provided with the personal information, and information on a de-identification level of the personal information to be provided to the external user;
transferring the smart contract to a block chain through a communication circuit of the electronic device;
receiving a request to provide the personal information from the block chain through the communication circuit of the electronic device;
processing, by the processor of the electronic device, the user's personal information encrypted and stored in a storage based on the smart contract in response to the request to provide the personal information;
checking whether the processed personal information is processed so as to be suitable for the information on the de-identification level of the personal information included in the smart contract;
transferring the processed personal information to the block chain in case that the personal information is processed so as to be suitable for the information on the de-identification level of the personal information included in the smart contract as the result of the checking; and reprocessing the personal information so as to be suitable for the information on the de-identification level of the personal information included in the smart contract in case that the personal information is not processed so as to be suitable for the information on the de-identification level of the personal information included in the smart contract as a result of the checking.

* * * * *